United States Patent [19]

Kawaguchi

[11] Patent Number: 5,555,552
[45] Date of Patent: Sep. 10, 1996

[54] APPARATUS FOR QUICKLY CAPTURING CORDLESS TELEPHONE CHANNEL TO BE MEASURED

[75] Inventor: Ei Kawaguchi, Kanagawa-ken, Japan

[73] Assignee: Leader Electronics Corporation, Kanagawa-ken, Japan

[21] Appl. No.: 246,162

[22] Filed: May 19, 1994

[30] Foreign Application Priority Data

May 20, 1993 [JP] Japan .................................. 5-118509

[51] Int. Cl.$^6$ .................................................. H04Q 7/38
[52] U.S. Cl. ........................ 379/61; 455/67.1; 455/226.1
[58] Field of Search ............................. 379/61; 455/67.1, 455/182.2, 183.1, 183.2, 192.2, 197.1, 226.1, 255, 257, 265, 316

[56] References Cited

U.S. PATENT DOCUMENTS

| | | | |
|---|---|---|---|
| 4,348,772 | 9/1982 | Leland et al. | 455/183.1 |
| 4,903,328 | 2/1990 | Ichikawa | 455/183.2 |
| 4,932,072 | 6/1990 | Toko | 455/183.2 |
| 4,982,165 | 1/1991 | Lowenschuss | 328/140 |
| 5,101,509 | 3/1992 | Lai | 455/183.2 |
| 5,107,522 | 4/1992 | Kitayama et al. | 455/265 |
| 5,115,515 | 5/1992 | Yamamoto et al. | 455/265 |
| 5,337,051 | 8/1994 | Tsu | 342/13 |
| 5,388,125 | 2/1995 | Toda et al. | 455/182.2 |

*Primary Examiner*—Dwayne D. Bost
*Attorney, Agent, or Firm*—Fish & Richardson PC

[57] ABSTRACT

An apparatus capable of quickly capturing a channel to be measured of a cordless telephone in a shorter period of time than the time required by a conventional apparatus. After the waves received within all channels are converted in respect of their frequencies by a frequency converter, those out of the band are eliminated by an all-channel band pass filter. The waves outputted from the filter are amplified by an intermediate frequency amplifier and then inputted to a counter circuit. Since magnitude of the amplitude of the signal in the received channel to be measured is two or three times as large as that of interference waves, the counter circuit outputs a value within (the frequency of the channel to be measured)±(a half of the frequency between channels), The data processing unit determines the channel to be measured closest to the count value and makes the oscillation frequency from a local oscillator conform to the frequency corresponding to the captured channel by means of a frequency control unit.

4 Claims, 5 Drawing Sheets

5,555,552

APPARATUS FOR QUICKLY CAPTURING CORDLESS TELEPHONE CHANNEL TO BE MEASURED

BACKGROUND OF THE INVENTION

1. Field of the Invention

The present invention relates to an apparatus for capturing a connecting T channel to be measured, when the channel connecting a parent telephone with a daughter telephone, the frequencies, the signal levels, modulation factor and so forth are to be measured for a cordless telephone.

2. Description of the Prior Art

At the time of adjustment and testing during manufacture or repair of a cordless telephone, it is necessary to determine which channel connects the parent and the daughter phones of a cordless telephone. For this purpose, an apparatus for quickly capturing a channel to be measured for a cordless telephone has been developed.

The following is an outline of the system of a low power type cordless telephone which will be described so that a conventional apparatus for capturing a channel to be measured may be readily understood. With regard to the frequency band to be applied, the 250 MHz band is used for transmission from a parent phone to a daughter phone and the 380 MHz band is used for transmission from a daughter phone to a parent phone. For each band, 89 channels are provided, and 87 channels out of the 89 channels are used as channels for communication and the remaining two channels are used as control channels. The relation between the channels for both parent and daughter phones is already decided in such a manner as that the connecting channel from a daughter phone to a parent phone may be determined once the connecting channel from a parent phone to a daughter phone is established.

According to such a cordless telephone system as described above, adjustment is made in such a way that, before the phones, that is a parent phone and a daughter phone, are connected to each other, a control code sent from one phone by way of a predetermined control channel is received and interpreted by the other phone. The reception tuned condition is so shifted from the control channel that the channel designated by the control code can be brought into a receptive condition, whereby a communication is received by way of the designated channel. Then, if the reception level at the designated channel of the other phone is below a specified level, connection is made by way of the designated channel. On the other hand, however, if the reception level at the designated channel of the other phone is above a specified level, a decision is made that the designated channel is already occupied by a signal of another phone, such that the reception tuned condition of the other phone is returned to the control channel. Then the one phone sends to the other phone by way of the control channel a code designating a different channel. Such operations are repeated until the phones are finally connected by way of a channel having a reception lever below a specified lever.

An example of a conventional cordless telephone tester or apparatus for capturing a channel to be measured, adapted to detect which channel is currently connecting the parent phone and the daughter phone which are to be tested in a cordless telephone system constituted as explained above is configured as shown in FIG. 1. As shown in FIG. 1, the apparatus for capturing a channel to be measured comprises various elements other than a reception measuring circuit 10. The channel signal which has been sent from a cordless telephone and received in the apparatus for capturing a channel to be measured is converted to an intermediate frequency $f_1$ by a frequency converter 14 which has received a local oscillation signal from a local oscillator 12 which is a voltage controlled osciliator. The converted channel then passes through a one-channel band pass filter 16 which allows only one channel having a central frequency of $f_1$ to be passed and amplified by an intermediate frequency amplifier 18. The signal which is contained in the amplified channel is then sent to a signal intensity sequential comparing circuit 20. The signal intensity sequential comparing circuit 20 includes a signal level detector 22, a level comparator 24 and a memory 26. The signal level detector 22 is adapted to detect the level of a signal sent from the intermediate frequency amplifier 18 and send the detected level to the level comparator 24. The level comparator 24 is adapted to compare the signal level of the other channel which was previously detected and stored in the memory 26, with the signal level which has been sent from the signal level detector 22 and to store in the memory 26 the higher signal level along with the channel corresponding thereto A data processing device 28 is adapted to read out the stored channel and the relative detected signal level and select the channel, the signal level of which is the highest, or capture the channel to be measured and send the signal representing the channel in question to a frequency control unit 30. When an electromagnetic wave having a frequency corresponding to the channel indicated by the signal received from the data processing unit 28 is received and the frequency converted, the frequency control unit 30 applies a required voltage to the local oscillator 12 in order to cause the local oscillator 12 to oscillate in a manner that the intermediate frequency after frequency conversion becomes $f_1$. In this way, the frequency control unit 30 is furthermore adapted to sequentially provide the local oscillator 12 with each voltage corresponding to each channel in a manner that the local oscillator 12 performs a frequency sweep, in order to cause the frequency converter 14 to convert frequencies of the control channel and the communication channel which have been received, sequentially into intermediate frequencies of $f_1$. It is to be noted that the reception measuring circuit 10 serves as a circuit for measuring the signal level, modulation factor, etc. of the cordless telephone to be tested after the channel to be measured has been captured as explained above, so that it is not directly related to the present invention.

As explained above, an apparatus for capturing a channel to be measured according to the prior art is adapted to detect sequentially tile signal levels for all channels of both control channels and communication channels of a cordless telephone to be measured, and then sequentially compare the intensity of signals to store the signal level which is the highest. As a consequence, since the apparatus decides and captures the highest reception channel after comparisons of all channels have been completed, a lot of time, generally, from several seconds to several tens of seconds, is required for the operation of capturing of the channel to be measured.

Furthermore, since a considerable time has been required as described above, it was impossible for conventional apparatus to capture a control channel when a cordless telephone is in the state of transmission before a parent phone and a daughter phone are connected via a connecting channel.

SUMMARY OF THE INVENTION

It is an object of the present invention to provide an apparatus for quickly capturing a channel to be measured of a cordless telephone system in a shorter period of time than the capturing time of a channel to be measured required by a conventional apparatus.

To achieve this object, an apparatus, according to the present invention, is used for quickly capturing a channel to be measured in which an electromagnetic wave is being transmitted by a cordless telephone which selects a channel not in use out of a plurality of predetermined channels and then performs communication wirelessly in said selected channel. The apparatus includes: a reception means for receiving only electric waves contained in the frequency band of all of said plurality of predetermined channels; a counting means for counting the number of waves of said electromagnetic waves received by said reception means; and a means for determining the channel to be measured on which said cordless telephone is transmitting the electromagnetic wave, in accordance with the value of counts counted by said counting means.

The reception means receives only such electric waves as are contained in the frequency band of all channels of a plurality of predetermined channels of a cordless telephone. The number of electromagnetic waves thus received is counted by the counting means, the means for determining the channel to be measured determines the channel to be measured on which the cordless telephone is transmitting electromagnetic waves in accordance with the count value counted by the counting means, whereby the channel to be measured of a cordless telephone to be measured can be quickly captured and the time required is considerably shortened as compared to a conventional apparatus.

In addition, although it was impossible in the conventional apparatus, the present invention makes it possible for channels to be captured, even when reception is repeatedly shifted by a cordless telephone between the control channel and the channel designated by the control channel, before a parent phone and a daughter phone are connected by a channel to be connected.

These and other objects and advantages will become clear by reading the following description of the invention with reference to the accompanying drawings.

DESCRIPTION OF THE PREFERRED EMBODIMENT

Figure 1:
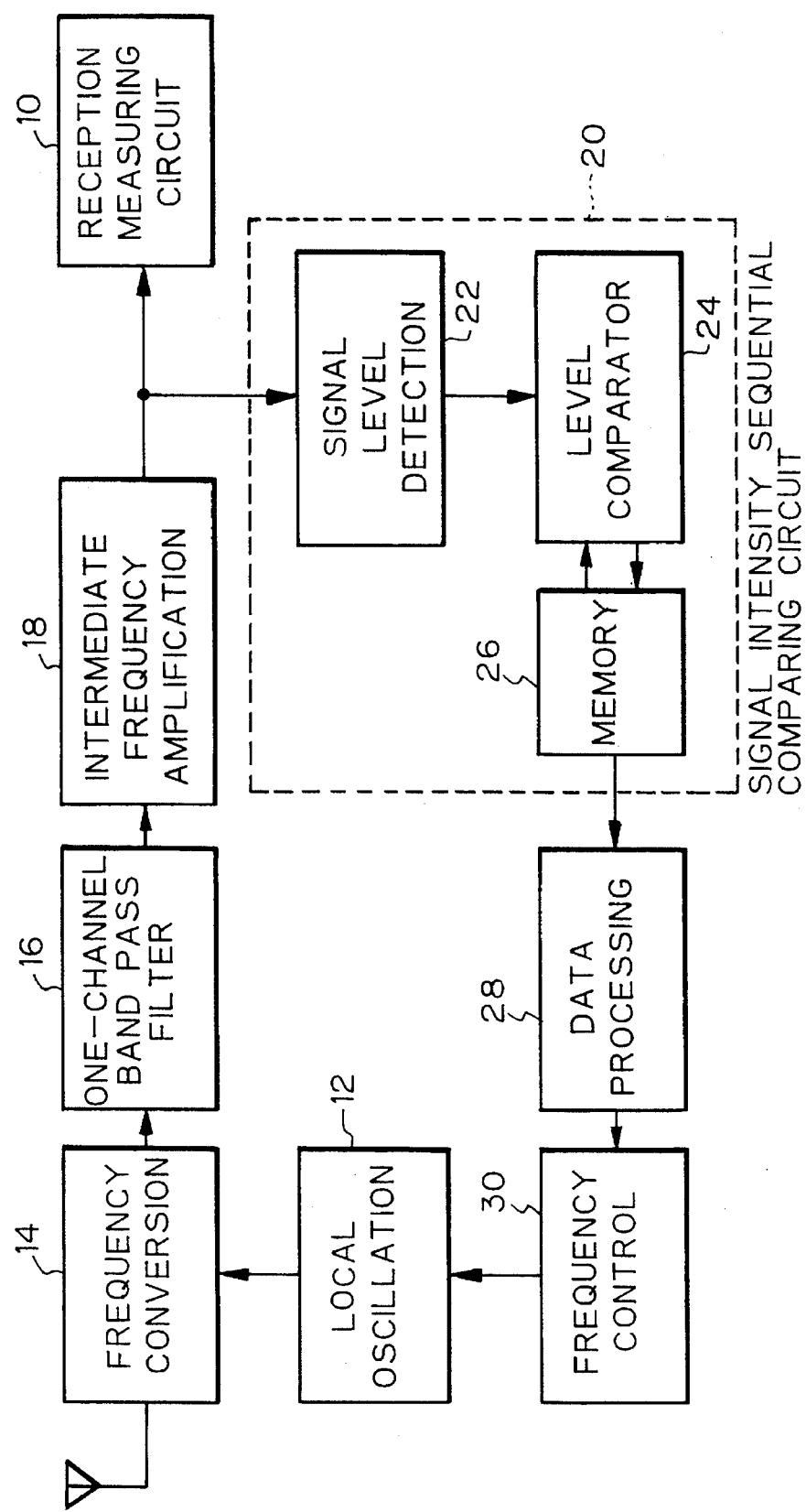
FIG. 1 illustrates a conventional apparatus for capturing a channel to be measured.
Figure 2:
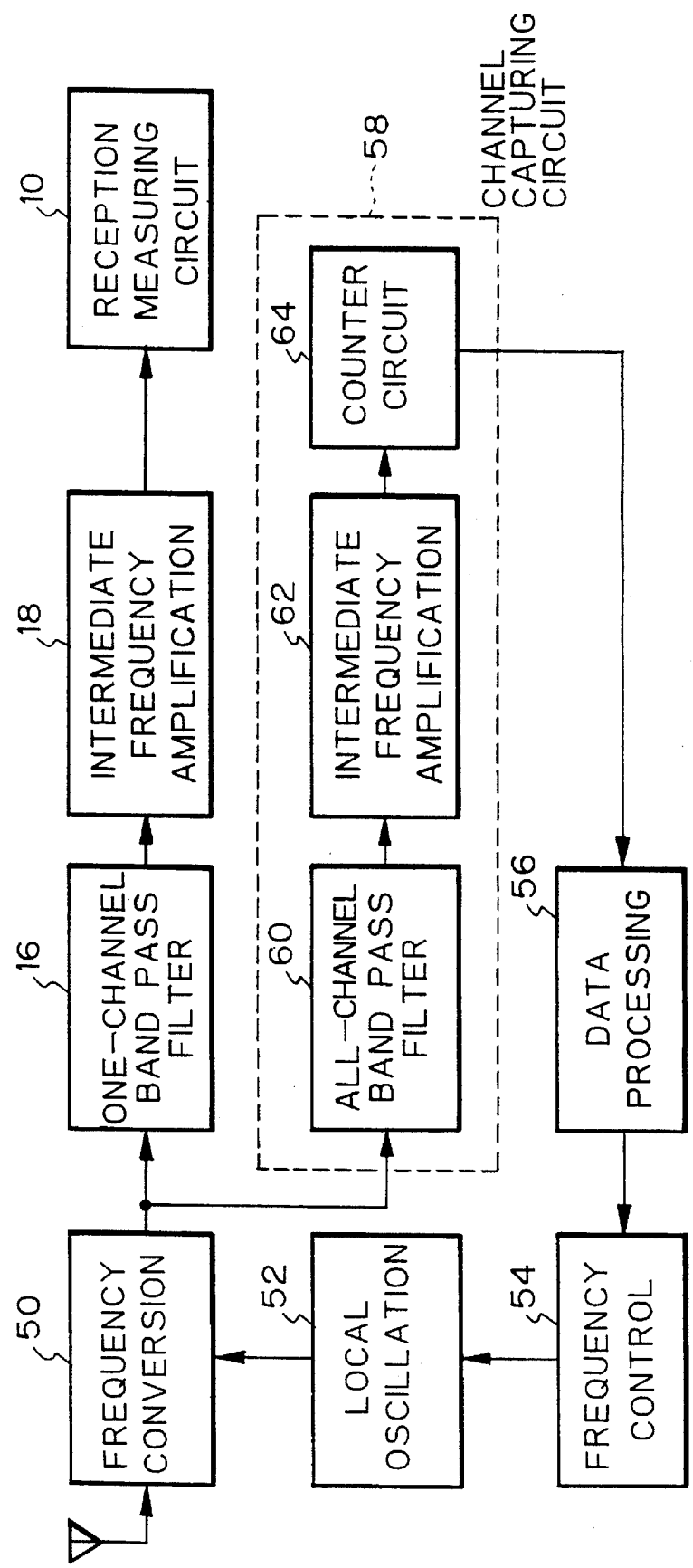
FIG. 2 illustrates the apparatus for quickly capturing a channel to be measured according to an embodiment of the present invention.

In FIG. 2, there is shown an apparatus for quickly capturing a channel to be measured according to an embodiment of the present invention. The reception measuring circuit 10 is not a part of the apparatus for quickly capturing a channel to be measured; it serves as a circuit for measuring the signal level, modulation factor, etc. of the channel to be measured after having captured the cordless telephone channel to be measured, similar to the prior art as shown in FIG. 1.

The elements designated by the reference numerals 16 and 18 in FIG. 2 are identical to the one-channel band pass filter 16 and the intermediate frequency amplifier 18 respectively shown in FIG. 1. These elements are provided for the purpose of enabling the signal level and modulation factor to be measured by the reception measuring circuit 10 and, therefore, do not necessarily form a part of the apparatus according to the present invention for quickly capturing a channel to be measured. The apparatus for quickly capturing a channel to be measured as shown in FIG. 2 includes a frequency converter 50, a local oscillator 52, a frequency control unit 54, a data processing unit 56 and an instantaneous most intensive channel capturing circuit 58. The instantaneous most intensive channel capturing circuit 58 includes an all-channel band pass filter 60, an intermediate frequency amplifier 62 and a counter circuit 64. The data processing unit 56 includes a CPU (not shown) and a memory (not shown), in which the processing takes place and control programs and data to be described later are stored. The local oscillator 52 comprises a voltage-controlled oscillator.

The frequency converter 50 can (1) receive all channels of 380 MHz band (more specifically, 89 channels at the band width 1.1 MHz between 380.2125–381.3125 MHz) or all channels of 250 MHz band (more specifically, 89 channels at the band width of 1.1 MHz between 253.8625–254.9625 MHz) by means of switching (not shown) in case of the small power type cordless telephone system mentioned above, and (2) receive a local oscillation signal provided by the local oscillator 52 so as to convert all channels to intermediate frequency waves having a band width, at least for all channels, with the central frequency of $f_1$. The signals thus converted are caused to pass through the all-channel band pass filter 60 having a band width for all channels at 1.1 MHz with the central frequency of $f_1$, whereby undesired waves out of the band width are eliminated. Only those waveforms which are included in the band width for all channels are amplified to a required extent by means of intermediate frequency amplifier 62 and sent to the counter circuit 64. As described later, the counter circuit 64 counts the number of times the applied waveforms make crossing from the negative side to the positive side relative to the zero level within a specified time and sends the counted value to the data processing unit 56. The data processing unit 56 is adapted to capture the channel, i.e., compute the corresponding frequency based on the specified time and the counted value and select the frequency, of the channel nearest to the computed frequency so as to determine the channel corresponding to the selected frequency.

As it will be apparent from the explanation to be given later, the channel thus captured will become the channel to be measured for a cordless telephone. The data processing unit 56 serves to store in the memory the channel thus captured and send a signal indicating the channel thus captured to the frequency control unit 54. The frequency control unit 54 generates, based on the signal thus sent thereto, a voltage and sends it to the local oscillator 52. The local oscillator 52 generates a local signal having an oscillation frequency depending upon the voltage. The frequency corresponding to the captured channel is converted to the value of $f_1$ by means of the frequency converter 50 by using the oscillation frequency of the local oscillator 52 depending upon the voltage. In other words, the frequency control unit 54 generates, based on the signal from the data processing unit 56, a voltage which is required in order that the frequency corresponding to the captured channel is converted to the value of $f_1$ by means of the frequency converter 50. By means of the operation as above described, such a signal as having the frequency of the captured channel, that is the channel to be measured and converted to $f_1$, is provided to the output of the frequency converter 50.

The present invention constituted as above described has been proposed in consideration of the following points:

(1) In the circumstance where the channel of a cordless telephone to be measured is to be captured by the apparatus according to the present invention electromagnetic waves transmitted by other cordless telephones or the like and so-called noise are present in the frequency band of all channels, any of which the cordless telephone can utilize. However, since the cordless telephone is placed in proximity to the apparatus for quickly capturing the channel, the reception level measurement, the level of signals being sent by is normally two or three times higher than the reception level of electric waves to be sent from other cordless telephones or the like.

(2) The ratio of the highest frequency relative to the lowest frequency of all channels available to a cordless telephone for use is very close to 1. For example, in the case of a small power type cordless telephone, the frequency to be transmitted by a daughter phone as above described is 254.9625 MHz at the highest frequency and 253.8625 MHz at the lowest frequency, so that the ratio of the highest to lowest frequencies is 1.0043 or very close to 1. In consideration of the intermediate frequency, supposing that the intermediate frequency is 10 MHz, the highest frequency is 10.55 MHz while the lowest frequency is 9.45 MHz, whereby the ratio is 1.116 or close to 1.

(3) When a plurality of signals having a ratio between the highest frequency and the lowest frequency being close to 1 are input to a frequency counter which is a counter circuit, the frequency counter is generally characterized by measuring the frequency of the signal having the largest magnitude of the amplitude of the signal when, out of a plurality of signals, the largest magnitude of the amplitude of the signal is larger than those other signals by 3-4 dB or more.

Accordingly, if such a counter circuit as a frequency counter is employed for the apparatus for quickly capturing a channel to be measured and a cordless telephone to be measured is placed in proximity to said apparatus for quickly capturing a channel to be measured, it is possible to measure only the frequency of the signal to be sent from the cordless telephone to be measured.

Figure 3:
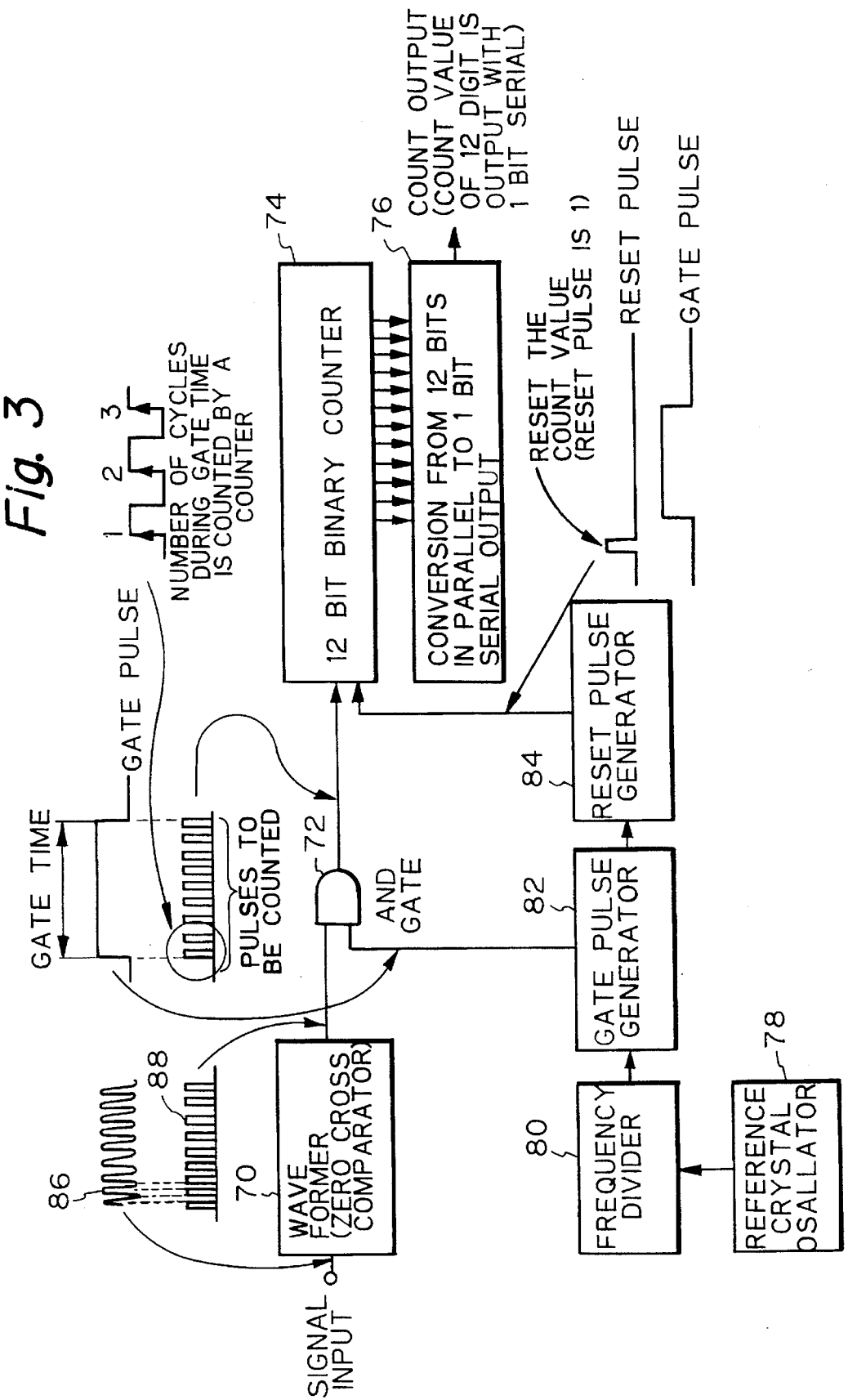
FIG. 3 is a diagram showing an example of the constitution and operation of a frequency counter in a counter circuit shown in FIG. 2.

The above-mentioned characteristic of the frequency counter will now be explained in greater detail. FIG. 3 is the explanatory diagram for the purpose of explaining the constitution and operation of the frequency counter of the counter circuit 64 shown in FIG. 2. The frequency counter comprises a wave former or a zero cross comparator 70 to which the signal to be measured is input; an AND gate 72 of which one terminal is input with the formed wave; a counter 74 comprising a 12 bit binary counter to which the output of the AND gate is input; a converter 76 adapted to convert 12 bit parallel output from the counter 74, to 1 bit serial output and output the same as the count value; a reference crystal oscillator 78; a frequency divider 80 adapted to divide the oscillation frequency derived from the reference crystal oscillator 78; a gate pulse generator 82 adapted to receive the signals divided by the frequency divider 80, generate a gate pulse and input the gate pulse to the other input terminal of AND gate 72; and a reset pulse generator 84 adapted to receive the gate pulse generated by the gate pulse generator 82, generate a reset pulse after lapse of a specified time and input the reset pulse to the counter 74.

Since the operation of the frequency counter when one signal is input to the zero cross comparator 70 is the one in a normal aspect of use and well known to those skilled in the art, the explanation thereof is intended to be made short. The signal designated by numeral 86 is converted by the zero cross comparator 70 to such a wave form as a designated by numeral 88 by using the zero level as the basis with the wave form at the negative side brought to the zero level and with the wave form at the positive side formed to rectangular waves. AND gate 72, while it is supplied with gate pulses from the gate pulse generator 82, causes a series of output pulses from the zero cross comparator 70 to be passed through the counter 74. The number of pulses thus passed is then counted by the counter 74 and the pulses are output by the converter 76 which converts 12 bits in parallel to 1 bit serial pulses as the count value of 12 digit.

Figure 4:
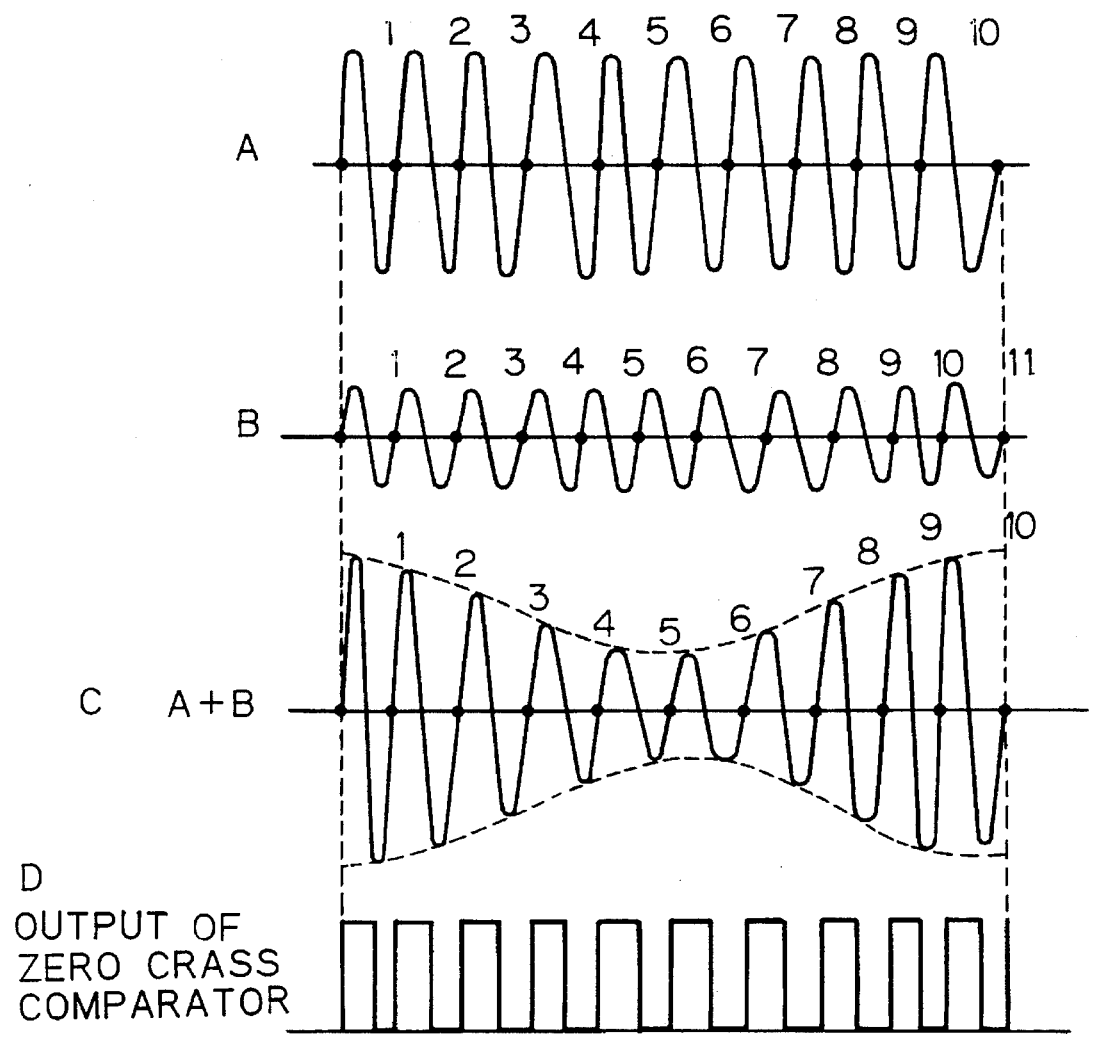
FIG. 4 illustrates wave forms in the case that two different signals A and:B having the frequency ratio of 1.1 and an amplitude ratio Of two are simultaneously input to the zero cross comparator 70 shown in FIG. 3, wherein A designates the wave form of the signal A having a frequency of 10 and an amplitude two times as high as that of the signal B, B designates the wave form of the signal B having the frequency of 11, C designates the composite wave of the signals A and B, and D designates the output wave form of the zero cross comparator 70 to which the composite wave C has been input.

Assume here that two signals A and B which have the ratio of their frequencies being 1.1 and the ratio of their amplitudes being two times are input to the zero cross comparator 70 simultaneously. Such a situation is illustrated in FIG. 4. In FIG. 4 which is illustrated only for a purpose of an exemplification in order to facilitate understanding, A designates the wave form of the signal A having a frequency of 10 and an amplitude two times as large as that of the signal B,B designates the wave form of the signal B having a frequency of 11 and C designates the composite wave of the signals A and B. As shown in C of FIG. 4, the wave form of the composite wave C varies in respect of its amplitude and phase (condensation and rarefaction of a wave) but the frequency, more specifically the number of oscillation per second, is 10 or same as that of the signal A. The composite wave C is converted by the zero cross comparator 70 to generate pulses having the same frequency as that of the signal A as shown in D of FIG. 4. Accordingly, the counter 74 will count only the frequency of the signal A.

Figure 5:
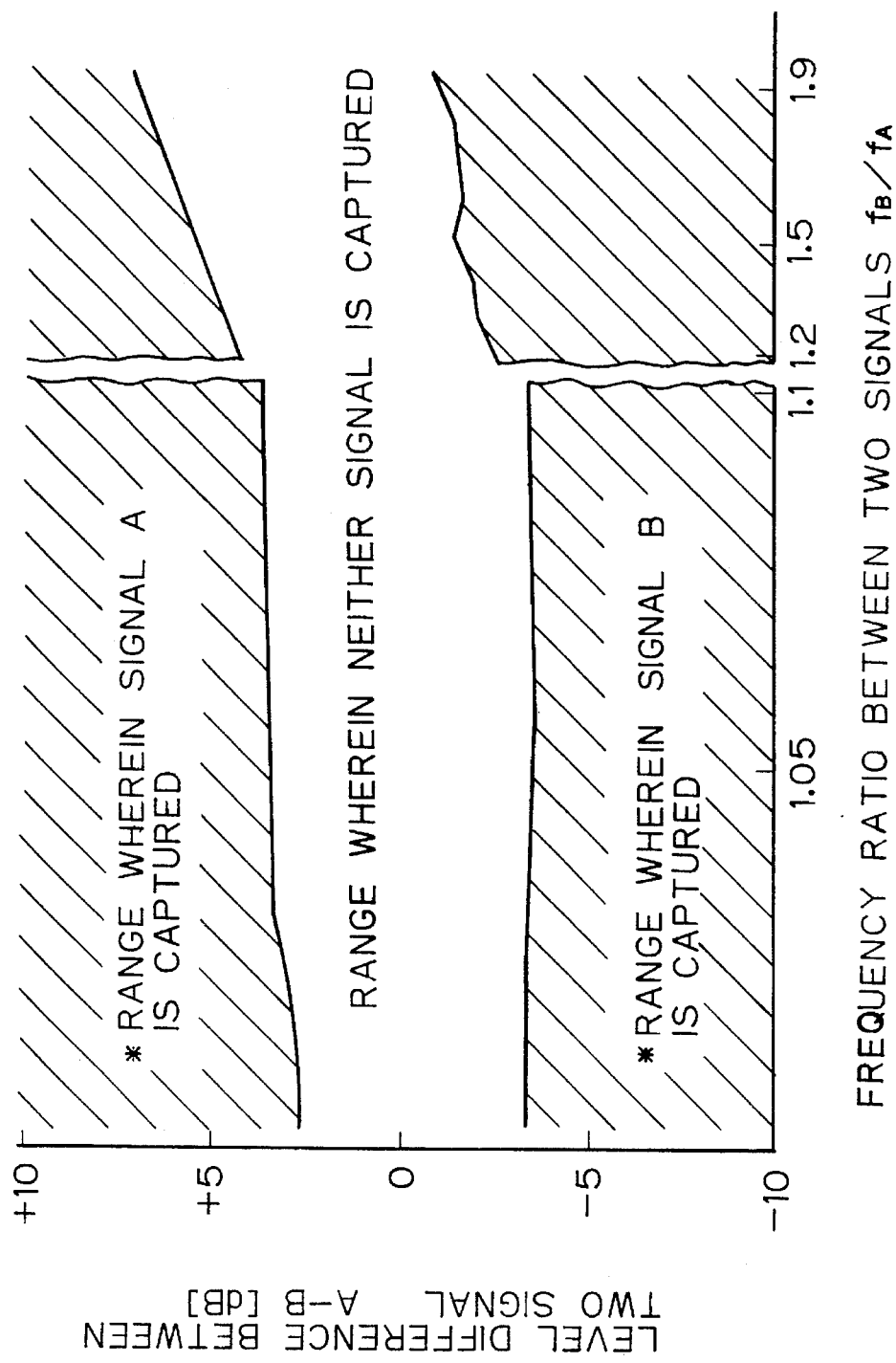
FIG. 5 illustrates capture of the composite wave obtained by varying the frequency ratio of two signals A and B, $f_B/f_A$ ($f_A$ indicates the frequency of the signal A and $f_B$ indicates the frequency of the signal B) and the level difference between the signals A and B, (A–B)dB.

FIG. 5 illustrates the result of having captured the signal when the composite wave has been input to the frequency counter shown in FIG. 3, the composite wave being obtained by varying the frequency ratio $f_B/f_A$ between two signals A and B ($f_A$ indicating the frequency of the signal A and $f_B$ indicating the frequency of the signal B) and the level difference (A−B)dB between the signal A and the signal B. It is to be noted, however, $f_A$ is fixed to 10.000 MHz while $f_B$ is varied and the counting time is 0.1 sec. In FIG. 5, the term "captured" means that the output count value is within the frequency of a signal having a higher signal level, $f_A$ (or $f_B$)±(12.5/.2) kHz while the term "not captured" means that the output count value is other than the above-mentioned value. It is also to be understood that 12.5 kHz is the space between channels to be employed for a small power type cordless telephone system. As explained earlier, if the frequency ratio of all channels to be used for a cordless telephone is close to 1, it is seen from FIG. 5 that if there is a level difference of more than approximately 3.5 dB between signals in case of two channels, the channel having a higher level can be captured by finding the frequency of the channel closest to the output count value. Upon actual measurement of a cordless telephone channel to be measured, the number of signals received by the apparatus for quickly capturing a channel to be measured is not limited to two as mentioned above. However, since the signal level of the channel to be measured is higher by 2–3 times or more (or 6–9.5 dB or more) relative to the interference signal, the output count value becomes within (the frequency of a channel to be measured)±(a half of frequency between channels) and then the frequency of the channel to be measured which is closest to the count value can be selected, whereby the channel to be measured can be captured.

According to the embodiment as above explained, after the reception channels are converted to intermediate frequency band, an all-channel band pass filter 60 is provided and count is made by the counter circuit 64. It is possible, however, to place the all-channel band pass filter for the frequency band of the reception channel before the frequency converter 50 and that count may be made in the frequency band of the reception channel directly without being converted into an intermediate frequency.

Furthermore, according to the embodiment as explained above, although explanation has been made by taking a small power type cordless telephone system as an example, the present invention can be equally applied in its entirety to a cordless telephone system in which a channel not in use is selected out of a plurality of specified channels in a so-called weak electric wave type cordless telephone system or the like and communication is wirelessly conducted by way of the selected channel.

The present invention has been described in detail with reference to a certain preferred embodiments thereof, but it will be understood that variations and modifications can be effected within tile spirit and scope of the invention.

What is claimed is:

1. In a cordless telephone system in which a cordless telephone selects a channel not in use out of a plurality of channels allocated in advance in a predetermined frequency band and then performs communication wirelessly in said selected channel, an apparatus for quickly capturing said selected channel as a channel to be measured in a condition in which said cordless telephone is transmitting an electromagnetic wave in said selected channel, while one or more other cordless telephones are transmitting electromagnetic waves in channels different from said selected channel, the level of the electromagnetic wave in the channels different from said selected channel being lower than the level of the electromagnetic wave in said selected channel at the position where said selected channel is captured as a channel to be measured, said apparatus comprising:

reception means for receiving electromagnetic waves contained in said predetermined frequency band;

counting means for counting the number of zero crossings of a wave having the highest amplitude among said electromagnetic waves which are contained in said predetermined channels and received by said reception means; and means for determining the channel to be measured in which said cordless telephone is transmitting the electromagnetic wave, in accordance with the value counted by said counting means.

2. An apparatus for quickly capturing a channel to be measured as claimed in claim 1 wherein said means for determining a channel robe measured selects the frequency closest to said counted value out of frequencies corresponding to said plurality of predetermined channels and determines the channel corresponding to said selected frequency as the channel to be measured.

3. An apparatus for quickly capturing a channel to be measured as claimed in claim 1 or 2 wherein said reception means includes a frequency conversion means for converting the frequency of the received electric waves to an intermediate frequency, an all-channel band pass filter for passing the frequency band of all of said plurality of predetermined channel, the frequency band being produced by a frequency conversion by said frequency conversion means, and a variable oscillation means for varying the oscillation frequency in response to a control signal and input the oscillated wave into said frequency conversion means, and said apparatus further comprises a control means for inputting said control signal to said variable oscillation means, said control signal controlling the oscillation frequency provided by said variable frequency means so that the high frequency signal contained in the frequency band of all of said plurality of channels of which frequencies have been converted by said frequency conversion means pass through said all-channel band pass filter, prior to determination of a channel to be measured by said means for determining a channel to be measured, and after said channel to be measured has been determined by said means for determining a channel to be measured, for generating another control signal based on the information on the determined channel to be measured and inputting said another control signal to said variable oscillation means so that the intermediate frequency derived by converting the frequency of the determined channel by means of said frequency conversion means is equal to a predetermined intermediate frequency.

4. An apparatus for quickly capturing a channel to be measured as claimed in claim 2 wherein said reception means includes a frequency conversion means for converting the frequency of the received electric waves to an intermediate frequency, an all-channel band pass filter for passing the frequency band of all of said plurality of predetermined channel, the frequency band being produced by a frequency conversion by said frequency conversion means, and a variable oscillation means for varying the oscillation frequency in response to a control signal and input the oscillated wave into said frequency conversion means, and said apparatus further comprises a control means for inputting said control signal controlling the oscillation frequency provided by said variable frequency means so that the high frequency signal contained in the frequency band of all of said plurality of channels of which frequencies have been converted by said frequency conversion means pass through said all-channel band pass filter, prior to determination of a channel to be measured by said means for determining a channel to be measured, and after said channel to be measured has been determined by said means for determining a channel to be measured, for generating another control signal based on the information on the determined channel to be measured and inputting said another control signal to said variable oscillation means so that the intermediate frequency derived by converting the frequency of the determined channel by means of said frequency conversion means is equal to a predetermined intermediate frequency.

* * * * *